(12) United States Patent
Loukas

(10) Patent No.: US 6,985,064 B1
(45) Date of Patent: Jan. 10, 2006

(54) CONDUCTING AND MAGNETIZING DOUBLE SPIRAL CAPACITOR-INDUCTOR

(76) Inventor: Kauko Jalmari Loukas, Kemintie 969, Rovaniemi (FI) 96700

( * ) Notice: Subject to any disclaimer, the term of this patent is extended or adjusted under 35 U.S.C. 154(b) by 232 days.

(21) Appl. No.: 10/681,716

(22) Filed: Oct. 9, 2003

(51) Int. Cl.
*H01F 27/24* (2006.01)

(52) U.S. Cl. .................................... 336/234
(58) Field of Classification Search ............. 336/65, 336/83, 192, 206–208, 234, 229; 335/284–295
See application file for complete search history.

(56) References Cited

U.S. PATENT DOCUMENTS 2,761,094 A * 8/1956 Frampton .................. 335/291
5,955,935 A * 9/1999 Proctor ..................... 335/291

* cited by examiner

Primary Examiner—Tuyen T Nguyen

(57) ABSTRACT

The invention, Conducting and Magnetizing Double Spiral Capacitor-inductor, consists of two insulated, conducting and at the same time, at least one of them, magnetizing spiral bands or tapes that are spooled in interleaved fashion into a spiral disk or roll and connected galvanically onto two electrodes that are placed on the opposite ends of the bands, one on each. The bands constitute a capacitor-inductor, and the electric current is always flowing in the same direction in both bands when the capacitor is charged or discharged creating a magnetic field that is perpendicular to the flat sides of the spiral disk or roll and to the electric field that lies perpendicularly between the bands. The otherwise free ends of the bands can be connected together with a fixed or adjustable resistive load to change the values of the device. This kind of combined capacitor-inductor can be used as a component in many electric apparatuses.

The invention could be used for example as substitutes for the coils of AC motors, in adjustable capacitor-inductors and capacitor-inductor loudspeakers, as electromagnetic pulse generators, AC electric net buffers, electromagnetic filters and electromagnetic emitters.

9 Claims, 2 Drawing Sheets

CONDUCTING AND MAGNETIZING DOUBLE SPIRAL CAPACITOR-INDUCTOR

RELATED APPLICATIONS

Common roll or foil capacitor, known over four decades.

| U.S. patent Documents | | |
|---|---|---|
| 3,521,209 | Jul. 21, 1970 | Lothar Fritz |
| 4,264,887 | Apr. 28, 1981 | William T. Barrett |
| 4,641,118 | Feb. 3, 1987 | Hirose; Tokuzo; Inoue; Ikuo |
| 5,410,289 | Apr. 25, 1995 | David Futa |
| 6,163,994 | Dec. 26, 2000 | Veso S. Tijanic |
| U.S. patent applications | | |
| 09/714,710 | Nov. 17, 2000 | Kauko Loukas |

BACKGROUND OF THE INVENTION

Inductor and capacitor are among the most general and important components in electric circuits. Then it is useful to reduce the amount of those components by combining the two component types, as in this invention is proposed. More benefit will be gotten when that combined component can be used in applications in which the mentioned two components can't be used alone or together. In addition the combined component can be made of cheaper materials than the corresponding two conventional components together.

DESCRIPTION OF THE PRIOR ART

A common roll or foil capacitor has inside it two thin, insulated foil bands spooled into a roll, equipped with electric wires connected onto the bands and closed in a cylindrical metal can. That kind of components has been used in electric apparatuses over 40 years. They are intended only for capacitors. A possible magnetic field in them is regarded only as an interference and tried to eliminate by letting the current to flow in the bands in opposite directions, and the material is not magnetizing. This invention is magnetizing, and the current flows in same direction in the bands.

U.S. Pat. No. 3,521,209: Electromagnetic load lifting device suggests replacing a portion of a conventional electric coil with a ferromagnetic material. The both coil portions are energized electrically to excite the magnet. There are no spirals, such as meant in this invention, but electric current circulates both in the conducting and magnetizing material that is wire, not spiral band, because they are galvanically one after another. There are many magnetic gaps between the loops of the magnetic coil in the direction of the magnetic field and the resistance is high, because the coil is wire, not spiral band, otherwise than in any band spiral magnet and this invention.

U.S. Pat. No. 4,264,887: Electro-lifting magnet is as a steel bowl upside down with two spirals inside in interleaved fashion, one magnetic, and another conducting with insulating coating overall on it. The conducting spiral has a lengthening piece outside of the magnetic spiral on the brim of the bowl. The magnetic spiral substitutes a conventional core and the conducting spiral a conventional coil. So, the device has two spirals and the electric current circulates only in the conducting spiral, while this invention has two insulated spirals in both of which electric current circulates and at least one of which is magnetizing depending on the application.

U.S. Pat. No. 4,641,118: Electromagnet and electromagnetic valve coil assemblies includes a coil unit having a plurality of electrically insulative substrates, each having a spiral conductor formed thereon and stacked paralleled. The conductors are connected in series, electric current flowing in them in the same direction and creating magnetic flux of the same direction in the central axis of the spirals, where there are holes for a moving ferromagnetic core. In the invention there are spiral conductors but no magnetizing spirals excited by electric current, and the ferromagnetic core is without electricity, otherwise than in this invention.

U.S. Pat. No. 5,410,289: Electromagnet, for lifting tasks, has a case and inside it three coil strips placed adjacent one another in an interleaved fashion. The strips, which are spirals, are insulator, magnet and conductor. The magnetic strip extends for only a part of the other strips. The electrical conductor strip comprises two segments, one of copper and another of aluminum, bonded together as with rivets. The conducting strip is excited by electric current but not the magnetic strip, but this invention has two excited strips or bands of which at least one is magnetizing.

U.S. Pat. No. 6,163,994: Display device and array is a changeable display element mounted on an insulating board and includes a conductor spiral that is excited by electric current. There is no magnetic core, conventional or spiral, whereas this invention has two excited strips or bands of which at least one is magnetizing.

patent application Ser. No. 09/714,710: Spiral electromagnet without coil is composed of a single impermanently magnetizable, conducting and insulated spiral band that is excited by electric current and closed in a housing if necessary. This spiral magnet can be a planar disc or curved into a cylindrical or calotte forms to put together whole cylinders, globes and other hollow magnets. But this invention has a double band and alternating current rotating in the same direction.

SUMMARY OF THE INVENTION

The invention, Conducting and Magnetizing Double Spiral Capacitor-inductor, consists of two insulated, conducting and at the same time, at least one of them, magnetizing spiral bands or tapes that are spooled in interleaved fashion into a spiral disk or roll and connected galvanically onto two electrodes that are placed on the opposite ends of the bands, one on each. The bands constitute a capacitor-inductor, and the electric current is always flowing in the same direction in both bands when the capacitor is charged or discharged creating a magnetic field that is perpendicular to the flat sides of the spiral disk or roll and to the electric field that lies perpendicularly between the bands. The otherwise free ends of the bands can be connected together with a fixed or adjustable resistive load to change the electromagnetic values of the device. This kind of combined capacitor-inductor can be used as a component in many electric apparatuses.

The invention could be used for example as substitutes for the coils of AC motors, in adjustable capacitor-inductors and capacitor-inductor loudspeakers, as electromagnetic pulse generators, AC electric net buffers, electromagnetic filters and electromagnetic emitters.

DETAILED DESCRIPTION OF THE DRAWINGS

The conducting and magnetizing double spiral capacitor-inductor in its simple base construction is made by spooling an insulated, no. 2, double conducting and, at least one band, magnetizing thin band no. 1, i.e. two similar or not similar bands, into a double spiral disk or roll as depicted in FIGS. 1–8. Electric current, mostly alternating, marked AC, but in some possible applications direct, DC, or both, is led to the two bands of the double spiral no. 1 via two insulated electrodes no. 3-4 in FIGS. 1–8 so that one electrode no. 3 lies at the center end of one band, at the inner band here, and the other electrode no. 4 lies at the rim end of the other band, at the outer band here. The center electrode can also lie at the outer band, in which case the rim electrode must lie at the inner band. A possible casing no. 6 of the double spiral and its insulation no. 7 have been depicted as a simple base one, FIGS. 1, 2, 4, 7, and 8, because it depends on an application and is not always needed. The flat and curved sides of the double spiral disk need always an insulation to prevent shortcuts between the band loops or between them and other conducting objects. The electrodes have insulation no. 9–10 in FIGS. 7–8.

Figure 1:
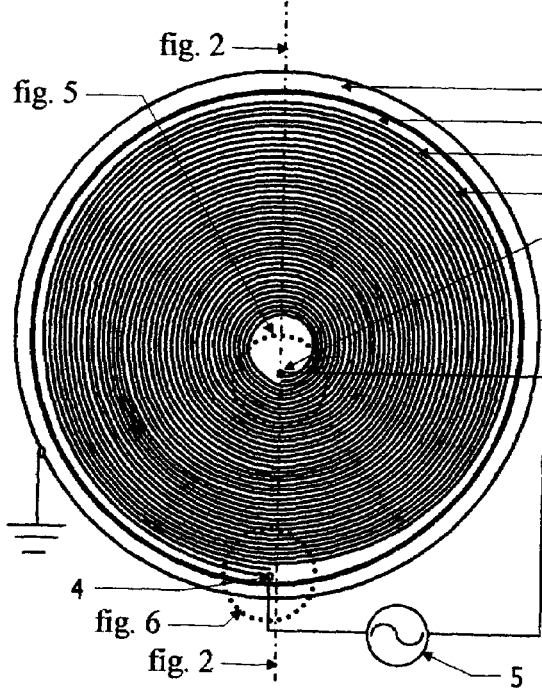
FIG. 1 depicts the front section view of the conducting and magnetizing double spiral capacitor-inductor in its simple base construction. No. 1 means the double spiral and no. 2 its insulation. No. 3 is the inner electrode at the inner end of one spiral band and no. 4 is the outer electrode at the outer end of the other band. No. 5 is the AC power source with the electric wires connected to the electrodes no. 3 and 4. No. 6 is a casing of a simple base form and no. 7 its insulation against the double spiral. Markings FIG. 2, FIG. 5, and FIG. 6 refer to the figures with those numbers.
Figure 2:
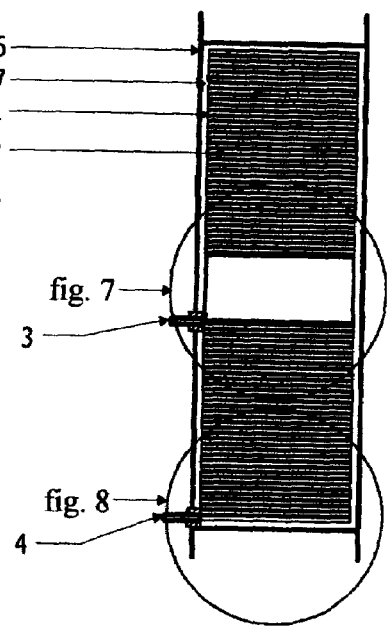
FIG. 2 depicts the vertical cross section view of the invention in the FIG. 1. No. 1–4 and 6–7 mean the same as in the FIG. 1. Markings FIG. 7 and FIG. 8 refer to the figures with those numbers.
Figure 3:
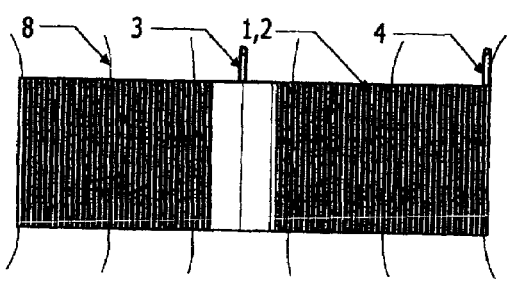
FIG. 3 depicts the horizontal cross section view of the invention in the FIG. 1 without a casing. No. 1–4 mean the same as in FIG. 1. Number 8 means the magnetic field protruding from the spirals, but the electric field lies perpendicularly to the magnetic field between the spiral bands.
Figure 4:
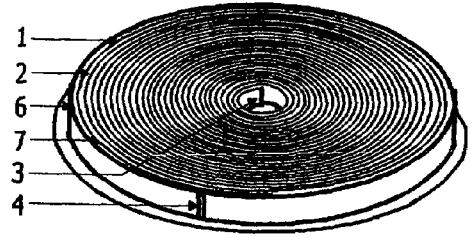
FIG. 4 depicts a perspective view of a double spiral in FIG. 1. No. 1–4 and 6–7 mean the same as in the FIG. 1.
Figure 5:
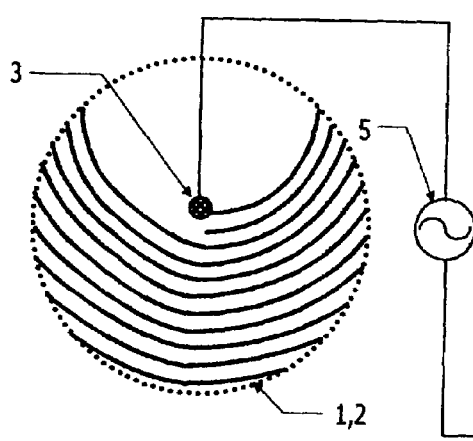
FIG. 5 depicts a partial enlargement of FIG. 1 as shown with the dot ring marked FIG. 5. No. 1, 2, 3, and 5 mean the same as in FIG. 1.
Figure 6:
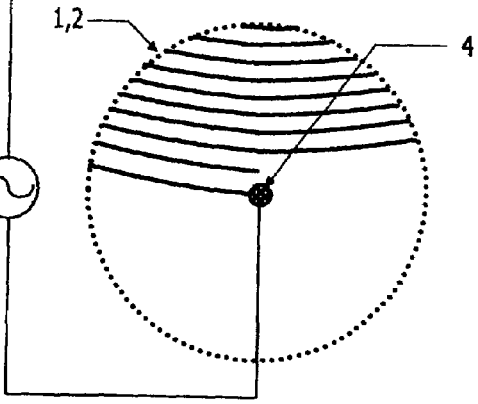
FIG. 6 depicts a partial enlargement of FIG. 1 as shown with the dot ring marked FIG. 6. No 1, 2, 4, and 5 mean the same as in FIG. 1.
Figure 7:
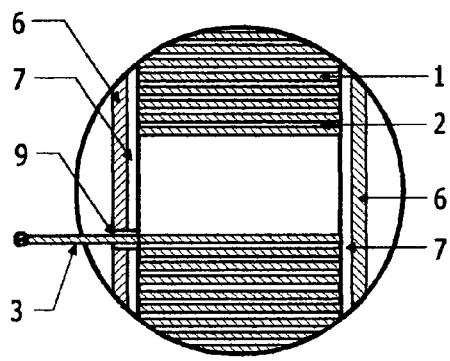
FIG. 7 depicts a partial enlargement of FIG. 2 as shown with the ring marked FIG. 7. No. 1-3, and 6-7 mean the same as in FIG. 1. No. 9 means an insulated eyelet for the inner electrode no. 3.
Figure 8:
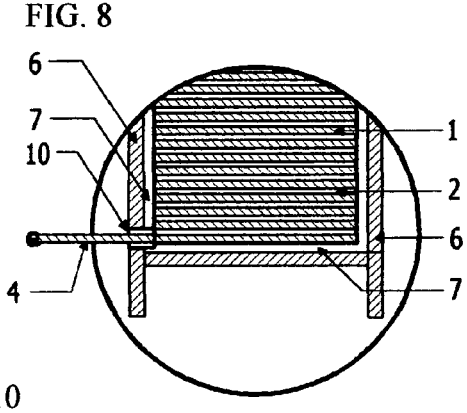
FIG. 8 depicts a partial enlargement of FIG. 2 as shown with the ring marked FIG. 8. No. 1, 2, 4, and 6-7 mean the same as in FIG. 1. No. 10 means an insulated eyelet for the outer electrode no. 4.

When an AC from an electric source no. 5 in FIGS. 1, 5, and 6 is connected on the electrodes, it always circulates in the same direction in both bands; and the double spiral band no. 1 functions at the same time both as a capacitor and an inductor, otherwise than a conventional roll capacitor that can function only as a capacitor or a spiral magnet that can function only as an inductor. When the free ends of the bands are totally insulated from each others, a DC can not circulate in the bands, but if there's a galvanic connection with a load no. 44 in FIG. 14 between the free ends, a DC can circulate in the bands, too, creating an unalterable magnetic field as a proper spiral magnet. Both AC and DC can be used at the same time, too, as in a capacitor-inductor microphone in FIG. 12.

When an AC is exciting the invention, it generates an alternating electromagnetic field in the double spiral disk and around it. The magnetic field protrudes from the double spiral as has been depicted in FIG. 3, no. 8, but the electric field exists perpendicularly between every two band loop, regardless of if the band loops belong to same or different double spiral loops. So, the single band loops get always alternate potential +, −, +, −, . . . or −, +, −, +, . . . compared with each others, if only the current is circulating instantly or constantly in the bands. If the capacitive and inductive reactance' s are equal in the invention, as can be done, they eliminate each others and there's only resistance left. No extra component is needed to balance an impedance of the device as with conventional capacitors and inductors, and there's no reactive power.

Figure 9:
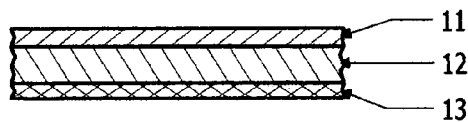
FIG. 9 depicts a partial front section enlargement of one band of the double spiral no. 1 in its base composition, when the bands are similar. No. 11 is a conducting layer and no. 12 a magnetizing layer functioning as a conductor, too, at the same time. No. 13 is an insulating layer.

The base construction of the double spiral is that it includes two identical bands consisting of a magnetizing layer, that also conducts, and an insulating layer. But in the general composition the bands include three layers as in FIG. 9, namely a conducting layer no. 11 of a good conductor substance, a magnetizing layer no. 12 that also conducts, and an insulating layer no. 13. The conducting and magnetizing layers need to be hot rolled together, and the insulating layer need to be fixed durably on one flat side of the metal band, single or composed one. It is useful if the insulator is magnetizing at same time, as with some magnetizing and insulating ferro-oxides, to increase the permeability of the double spiral disk. Oxides also endure high temperatures of some applications.

Figure 10:
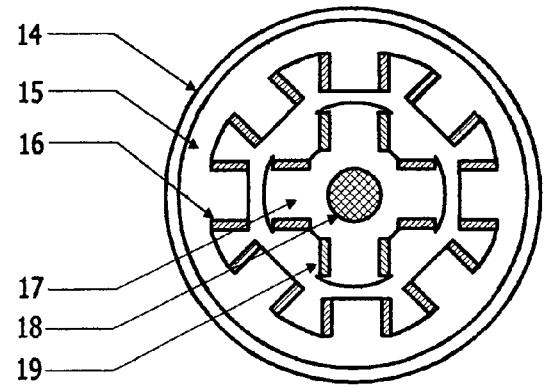
FIG. 10 depicts an application of the invention for a substitute of the coils of an AC electric motor. No. 14 means the motor-casing and no. 15 the magnetizing plate stack inside the casing functioning as the stator of the motor. No. 16 means the invention substituting the coils installed at the stator. No. 17 means the magnetizing plate stack functioning as the rotor of the motor and no. 18 its axis. No. 19 means the invention substituting the coils installed at the rotor of the motor.

The first application presented here is as depicted in the FIG. 10, where the invention has been used as substitutes for AC motor coils no. 16 and 19 at the stator no. 15 and rotor no. 17. This gives some advantages as lower price and weight, eliminating of reactance and reactive power in the motor and the electric net, using natural power in running the motor, eliminating magnetic gaps between coil-wire loops, and giving possibility to endure higher temperatures by using such insulating materials as metal oxides that do not burn.

Figure 11:
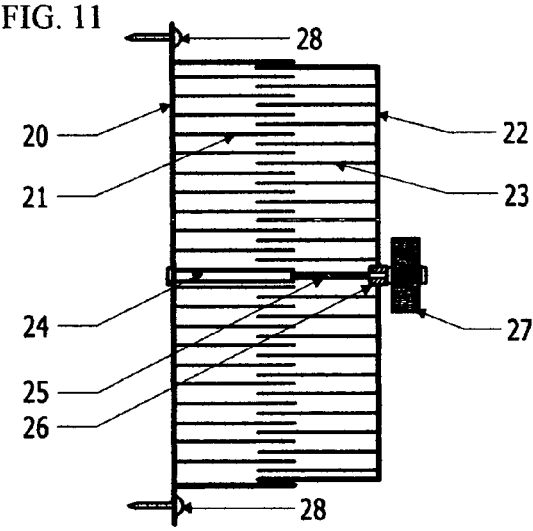
FIG. 11 depicts an application of the invention into an adjustable capacitor-inductor. No. 20 is a fixed casing with one spiral band no. 21 inside it. No. 22 is a movable casing with the other spiral band no. 23 inside it. No. 24 is a tube-case with a screw thread inside it fixed in the center of the casing no. 20. No. 25 is a screw-stick intruding into the tube-case no. 24. No. 26 is a bearing of the screw-stick no. 25 fixed in the center of the casing no. 22. No. 27 is an adjusting knob fixed at the outer end of the screw-stick no. 25. No. 28 are the retaining screws or bolts in their base form.

As the second application is presented an adjustable double spiral capacitor-inductor in the FIG. 11, where there is an immovable spiral no. 21 fixed inside its casing no. 20 that has been installed in its place, and a movable spiral no. 23 fixed inside its casing no. 22 that can be moved back and forth with an adjusting knob no. 27 to change both capacitance and inductance of the device when needed. The adjusting knob is fixed at the outer end of a screw-stick no. 25, which in its turn is put through the bearing no. 26 into a tube-case no. 24 that is fixed perpendicularly at the inside center of the immovable casing no. 20 and has a screw thread inside it. The spiral bands have to be fixed at the bottoms of their casings with a substance that is strong and insulative enough. Between of the casings no. 20 and 22 at their rims has to be straight furrows that fit interlocked to each others to keep the movable casing no. 22 from rotating. The insulation of the spiral bands has to endure chafing when adjusting, or the bands have to be separated from each others by a sufficient air gap between them to prevent chafing and shortcuts. Fixing with the screws no. 28 is only an example and can be done otherwise, too.

Figure 12:
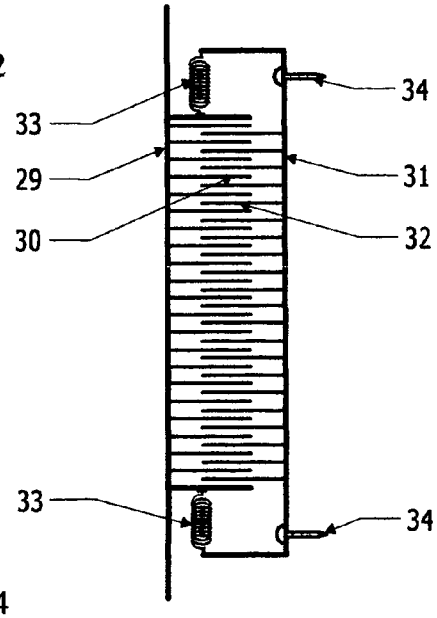
FIG. 12 depicts an application of the invention into a capacitor-inductor microphone. No. 29 is a sound vibrating casing with one band no. 30 of the double spiral inside it. No. 31 is a fixed casing with the other band no. 32 inside it No. 33 are springs, at least four pieces of them radially with equal intervals between the casings, that keep the vibrating casing no. 29 in its place but allow it to vibrate. No. 34 are retaining screws or bolts in their base form.

The invention can be applied into a capacitor-inductor microphone-speaker, too, as FIG. 12 depicts. The base construction is the same as in FIG. 11, except that instead of using the adjusting knob with a screw-stick, bearing, and tube-case the movable casing 29 with its expansion rim plate has been suspended with radial springs, at least four of them, no. 33, between the casings. So, the casing no. 29 with its spiral band no. 30 can vibrate when sending or receiving sound waves, if only it has been made light enough. The bands no. 30 and 32 have always to be separated from each others by a sufficient air gap between them to prevent chafing and shortcuts. Fixing with the screws no. 34 is only an example and can be done otherwise, too. When the device functions as a microphone, the entering sound waves make the casing no. 29 with its spiral band no. 30 to vibrate and generates an alternating electric current in the fixed band no. 32 that need a pre-magnetization with a direct current or by making the magnetizing layer of the band permanently magnetized. The generated alternating current need then to be amplified for its purpose. When the device functions as a speaker, the amplified alternating current imitating the sound to be transmitted is circulating in the fixed band no. 32 generating a corresponding magnetic field that makes the vibrating band no. 30 and its casing no. 29 to transmit the purported sound. In this case, too, can be used pre-magnetization for the fixed band no. 32 when needed.

Figure 13:
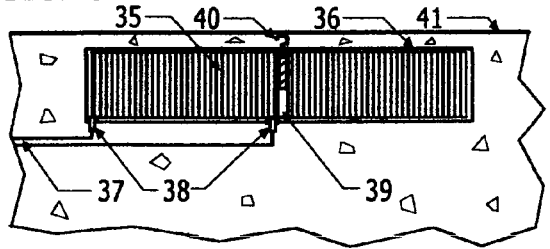
FIG. 13 depicts an application of the invention into an electromagnetic pulse generator for stopping speeding vehicles in traffic when installed under a driving lane number. 41. No. 35 is a strong double spiral and no. 36 its suitable casing. No. 37 are the electric wires bringing a strong alternating current into the electrodes no. 38. No. 39 is a lifting tube with a screw thread inside it for attaching a lifting hook number 40.

One application, the fourth one here, can be an electromagnetic pulse generator as depicted in figure 13. The device no. 35 itself with its casing no. 36 can be installed under a road surface 41 or temporarily placed on the road with driving slopes to stop speeding vehicles. AC is led with the leads no. 37 from a public network or other strong electric source via the electrodes no. 38 to the double spiral no. 35. The lid of the casing has to be of dielectric substance to let the electromagnetic radiation through, but the bottom and the cylinder part of the casing has to be of conducting or both conducting and magnetizing material to align the radiation into the purported direction and prevent it from dispersing. A strong pulse will ruin the electronic circuits of the vehicle and stop it. The device could be trigged with a magnetic sensor, speed radar, manually by electric leads and a switch, or otherwise. For lifting and moving the device has been depicted a lifting tube no. 39, fitted perpendicularly in the center of the inside bottom of the casing no. 36, with a screw thread inside it, and a lifting hook no. 40 screwed into the lifting tube when lifting.

As the fifth application could be presented the invention in its base form, FIG. 1, to be installed or plugged into the public electric source, in all three phases when needed, to function as buffer components. If it has usable dimensions, it can transmit enough AC power for devices that need it but stop any DC and smooth instant voltage or current pulses. It can also smooth voltage and current pulses that go through the electric net e.g. during a thunder storm. With large dimensions and plurality it could prevent large electric nets from collapsing, when an electric disturbance happens during high consumption, by giving the safety system a critical time to react without panic.

Figure 14:
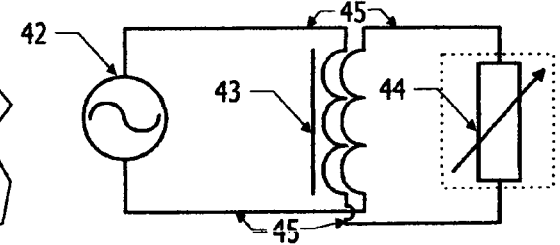
FIG. 14 represents a base connection of the invention. No. 42 is an AC electric power source giving power for the invention unit no. 43 that has been indicated with a special symbol in the lack of a suitable general symbol. No. 44 inside a dashed line box means a possible resistive load, adjustable as in the figure or fixed, used in some applications. No. 45 means the necessary electric leads.

Because the invention includes both capacitor and inductor functions, a special presentation has to be used for it as the FIG. 14 depicts, with a base connection of the invention. No. 42 is an AC electric power source giving power for the invention unit no. 43 that has been indicated with a special symbol in the lack of a suitable general symbol. The symbol consists of two general inductor symbols parallelly to each other, this way meaning also a capacitor, alongside of a stroke symbolizing a ferromagnetic core of an inductor. In some applications is needed a connection between the otherwise free ends of the spiral bands, allowing also a possible DC circulating through the bands and creating a stable electric and magnetic field; so no. 44 inside a dashed line box means a possible resistive load, adjustable as in the figure or fixed. No. 45 means the necessary electric leads as in all circuits. This circuit diagram resembles that of electromagnetic filters; and this invention, FIGS. 1–8 and 11, could be used as a filter, too, as well as a general electromagnetic radiator generating electromagnetic waves of different wavelengths depending on its dimensioning.

Also other applications can be found, for example a general electromagnetic emitter with its metal casing open on one flat side and functioning as a transmitting antenna. It is useful to reduce the amount of components by combining capacitor and inductor functions or to diminish reactance.

What is claimed is:

1. Conducting and Magnetizing Double Spiral Capacitor-inductor, comprising:

an arrangement to combine an electric capacitor and an electric inductor by means of a double spiral, the structure of said device made by spooling double thin band, consisting of two parallel, electrically insulated on both sides and rims, as well as conducting and, at least one of them, magnetizing bands, placed one on top of the other, into a double spiral disk or roll that operates as an electromagnetic device having properties both of a capacitor and an inductor;

an electric current, mostly alternating current but in some possible applications direct current or both of them, being led to the two said bands of said double spiral disk or roll via two electrodes, that are connected to their places on different said bands and opposite ends of those, so that one electrode lies at the center end of one said band, and the other electrode at the outer end of the other said band;

said disk or roll may having an insulated casing, depending on applications of the invention;

said electrodes having insulation against other metal surfaces except those they are attached to;

the flat and curved sides of said double spiral disk or roll having an insulation to prevent shortcuts between the band loops or between them and other conducting objects;

said electric current from an electric source being connected on said two electrodes and always circulating in the same rotational direction in said both bands;

a resistive load being connected between the ends, that are without electrodes, of said two bands when needed;

said double spiral band decreasing parts and their room by operating at the same time both as a capacitor and an inductor as well as giving some applications that a capacitor and an inductor together have not allowed until this.

2. The Conducting and Magnetizing Double Spiral Capacitor-inductor, according to claim 1 having:

the free ends without connection to said electric source of said bands being totally insulated from each others, except via said electric source, when allowed only alternating current to circulate in said bands and flowing through said double band in the same rotational direction;

said bands having a connection made by a resistive load between the otherwise free ends of said bands when needed a direct current to circulate in said bands to create an unalterable pre-magnetic field, or using both alternating and direct current together in said bands when needed to;

an alternating current, when exciting said invention, generating an alternating electromagnetic field in said double spiral and around it, the magnetic field protruding from said double spiral disk or roll perpendicularly to its flat sides, but the electric field existing perpendicularly between every two band loop, regardless of if the band loops belong to the same or different said double spiral loops, getting always alternate potential +, −, +, −, . . . or −, +, −, +, . . . compared with each others;

the capacitive and inductive reactance's being equal in said invention with due dimensions eliminating each others and allowing only resistance to be left, needing no extra component to balance an impedance of said invention and having no reactive power;

said two bands including at most three layers that are: a conducting layer of a good conductor substance, a magnetizing layer that also conducts, and an insulating layer being, when desired, magnetizing at same time as some magnetizing and insulating ferro-oxides, to increase the permeability of said double spiral disk, at least one of said two spiral bands including at least a magnetizing and at the same time conducting layer and an insulating layer that may magnetize, too, if wanted to.

3. The Conducting and Magnetizing Double Spiral Capacitor-inductor, according to claim 2 used:

as substitutes for alternating current motor coils in electric motors;

the arrangement, structure, and operation of said substitutes being as they are depicted in claim 2;

whereby electric motors working more effectively consuming no or but a little reactive power.

4. The Conducting and Magnetizing Double Spiral Capacitor-inductor, according to claim 2 used:

as an adjustable double spiral capacitor-inductor with an arrangement of changing axial position of one of said two bands in relation to the other of said double spiral depicted in claim 2, and a structure including immovable spiral band fixed inside its immovable casing, installed in its place, and imbricately with said immovable spiral band a movable spiral band fixed inside its movable casing that can allow an operation when being moved back and forth with an adjusting means to change both capacitance and inductance of said double spiral, both of said casings having a cylindrical brim and a plane bottom, the bottoms of said casings being outwards from said two bands and their open sides with said bands being towards each others;

said knob adjusting means being fixed at the outer end of a screw-stick, which in its turn being put thro bearing into a tube-case being fixed at its inner end perpendicularly at the inside center of said immovable casing, said tube-case having a screw thread inside it;

said spiral bands being fixed at the bottoms of their said casings with a substance strong and insulative enough;

between said casings at their rims being longitudinal straight furrows fitting interlocked to each others to keep said movable casing from rotating but allowing it to move axially;

said insulation of said two bands having to endure chafing when adjusting, or said bands having to be separated from each others by a sufficient air gap to prevent chafing and shortcuts, said air gap substituting said insulation.

5. The Conducting and Magnetizing Double Spiral Capacitor-inductor, according to claim 2 used:

as a capacitor-inductor microphone-speaker with an arrangement of changing axial position of one of the two spirals of the double spiral depicted in claim 2, and a structure including immovable spiral band fixed inside its immovable casing, installed in its place, and imbricately with said immovable spiral band a movable spiral band fixed inside its movable casing, the movable casing with its expansion plate rim being suspended with radial springs between said rim and said immovable casing allowing the device to operate as a microphone as well as a speaker;

said spiral bands being fixed at the bottoms of their said casings with a substance strong and insulative enough;

said movable casing with its spiral band vibrating when sending or receiving sound waves;

said bands always during operation being separated from each others by a sufficient air gap between them to prevent chafing and shortcuts;

when said microphone-speaker operating as a microphone, the entering sound waves making said movable casing with its said spiral band to vibrate generating an alternating electric current in the fixed spiral band, at least one of said bands needing a pre-magnetization with a direct current or by making at least one magnetizing layer of said bands permanently magnetized;

said generated alternating current being amplified for its purpose;

and when said microphone-speaker operating as a speaker, an amplified alternating current imitating a sound to be transmitted being circulating in said fixed band generating a corresponding magnetic field making said vibrating band and its said casing to transmit the purported sound, using pre-magnetization for at least one of said bands when needed.

6. The Conducting and Magnetizing Double Spiral Capacitor-inductor, according to claim 2 applied:

to an electromagnetic pulse generator, arranging said generator by, with its casing, getting it installed under a road surface, or temporarily placed on the road with its driving slopes, operating to stop speeding vehicles;

a strong alternating current being led with leads from an alternating current electric source via two said electrodes to said double band;

the lid of said casing being of dielectric substance to let the electromagnetic radiation going through, but the bottom and the cylinder part of said casing being of conducting or both conducting and magnetizing material to align the radiation into the purported direction and prevent it from dispersing;

said generator emitting a strong electromagnetic pulse to ruin electronic circuits of the said vehicle and stop it;

said generator being triggered manually, electrically, magnetically, or electromagnetically;

for lifting and moving said generator being used a lifting tube fitted perpendicularly at the center of the bottom of said casing and jutting upwards with a screw thread inside it as well as a lifting hook screwed into the lifting tube when lifting.

7. The Conducting and Magnetizing Double Spiral Capacitor-inductor, according to claim 2 applied:

as an arrangement of buffer components as installed or plugged into a public electric source in numbers, in all three phases when needed;

said components with usable dimensions being able to transmit enough alternating current power for devices needing it but stopping any direct current;

said components being also able to smooth voltage and current pulses going through the electric net as during a thunder storm or other disturbances;

with large dimensions and plurality said invention being able to prevent large electric nets from collapsing, when an electric disturbance happens during high consumption, by giving the safety system a critical time to react without panic.

8. The Conducting and Magnetizing Double Spiral Capacitor-inductor, according to claim 2 used:

as an arrangement of a band-pass or band-reject filter depending on the circuit diagram and the dimensions of said filter, whereby reducing electric components;

the structure and operation of said filter being as depicted in claim 2.

9. The Conducting and Magnetizing Double Spiral Capacitor-inductor, according to claim 2 used:

as an arrangement of an electromagnetic emitter transmitting electromagnetic waves of a wavelength depending on the dimensions of said emitter;

the structure of said emitter having an insulated metal casing, open on one of the flat sides of said emitter in a transmitting direction;

said emitter operating as a beamed transmitting antenna, whereby reducing number of components of some transmitting devices and making them cheaper and more simple.

* * * * *